United States Patent [19]
Kamimura

[11] Patent Number: 5,967,883
[45] Date of Patent: Oct. 19, 1999

[54] WORKING APPARATUS PROVIDED WITH ROTARY TABLE FOR MASS-PRODUCTION OF GEARS

[75] Inventor: Ichirou Kamimura, Hiroshima, Japan

[73] Assignee: Namu Co., Ltd., Hiroshima, Japan

[21] Appl. No.: 08/991,988

[22] Filed: Dec. 17, 1997

[30] Foreign Application Priority Data

Dec. 28, 1996 [JP] Japan .................................. 8-358650

[51] Int. Cl.$^6$ ........................................... B24B 19/00
[52] U.S. Cl. ........................... 451/129; 451/47; 451/219; 451/253
[58] Field of Search ............................ 451/47, 48, 124, 451/127, 129, 178, 219, 253, 379, 389; 409/26, 27, 28, 29, 43, 51; 407/24, 26, 28, 23

[56] References Cited

U.S. PATENT DOCUMENTS

| | | |
|---|---|---|
| 4,780,990 | 11/1988 | Cody, Jr. . |
| 4,799,337 | 1/1989 | Kotthaus . |
| 5,800,103 | 9/1998 | Stadtfeld et al. . |
| 5,823,857 | 10/1998 | Tan . |

FOREIGN PATENT DOCUMENTS 7-56324  6/1995  Japan .

OTHER PUBLICATIONS

Nikkei Mechanical, Oct. 28, 1996, No. 492, pp. 12–13.

*Primary Examiner*—Timothy V. Eley
*Attorney, Agent, or Firm*—Oliff & Berrgidge, PLC

[57] ABSTRACT

Coriolis motion gears can be produced in a mass-production manner and in low cost as follows: A ceiling surface of a body 8 is formed into a rotary table 9 and a drive shaft 11 is projected from a center of the rotary table. A slant portion 11a is formed at its end, and a turntable 12 on which a workpiece 13 is mounted is supported rotatably to the slant portion. The turntable 12 is rotated by the tooth number difference between the Coriolis motion gear pair $A_1'$ and $A_2'$ per one turn of the drive shaft 11 to determine a working position of the workpiece. Also, the workpiece 13 is maintained on the turntable 12 so that a swivel center $P_1$ of the Coriolis motion gear pair is identical with a swivel center when the workpiece is installed into a gear device to take a Coriolis motion. As a result, the work surface of the workpiece takes a moving locus of the Coriolis motion gears integral with the turntable 12. When a cutter wheel 18 is moved in a direction of a tooth in synchronism with the turntable, the cutter wheel 18 is brought into contact therewith so that the gear that forms the couple with the workpiece is engaged with the working surface of the workpiece to form a desired tooth shape.

4 Claims, 6 Drawing Sheets

WORKING APPARATUS PROVIDED WITH ROTARY TABLE FOR MASS-PRODUCTION OF GEARS

BACKGROUND OF THE INVENTION

1. Field of the Invention

The present invention relates to a working apparatus for mass-production of workpieces such as Coriolis motion gears or the like.

2. Description of the Related Art

The workpiece to be machined by the working apparatus according to the present invention will now be described by using a sample of a Coriolis motion gear. By the way, a principle of a speed change gear train using a so-called Coriolis motion gear which performs the Coriolis motion (hereinafter referred to as a Coriolis motion gear device) is conventionally known. With such a Coriolis motion gear device, it is possible to obtain a large speed reduction ratio using only four gears. The Coriolis motion gear device has various advantages. However, for the Coriolis motion gear, it is necessary to make a gear tooth configuration a spherical involute gear form that is difficult to produce in low cost with a high precision. This is not yet practically produced. The present inventor has made it possible to put the Coriolis motion gear into practice by using a gear configuration instead of the spherical involute gear form. The detail of this Coriolis motion gear device is disclosed in Japanese Patent Examined Publication No. Hei 7-56324.

FIG. 5 shows the Coriolis motion gear device disclosed in the above publication. The Coriolis motion gear device has first through fourth gears $A_1$ to $A_4$ as the four gears having different gear tooth number. Among these gears, the first gear $A_1$ is a fixed gear formed integrally with a housing 6. The second gear $A_2$ and the third gear $A_3$ are formed on a rotary member 3 supported by an input shaft 1. Also, the fourth gear $A_4$ is provided on an output shaft 2 and is pivoted by the housing 6. Then, the first, second, third and fourth gears $A_1$ to $A_4$ are engaged with each other.

The rotary member 3 is supported by a slant portion 1a having a predetermined angle relative to an axis of the input shaft 1. Also, the input shaft 1 itself is supported rotatably to the housing 6. When the input shaft 1 rotates, the slant portion 1a takes a swing motion. The rotary member 3 pivoted to this takes a swing motion like a spinning top just before stopping. This motion of the rotary member 3 is referred to as the Coriolis motion. Also, by the Coriolis motion of the rotary member 3, the second gear $A_2$ and the third gear $A_3$ are caused to engage with the first gear $A_1$ and the fourth gear $A_4$, respectively (see FIGS. 6A and 6B). The second gear $A_2$ rotates relative to the first gear $A_1$ corresponding to the gear tooth difference from the first gear $A_1$ per one cycle of the Coriolis motion (i.e., one turn of the input shaft 1). Namely, one stage speed reduction is attained between the first gear $A_1$ and the second gear $A_2$. The motion of the second gear $A_2$ is directly transmitted to the third gear $A_3$. The same engagement is attained between the third gear $A_3$ and the fourth gear $A_4$. Also, one stage speed reduction is attained between the third gear $A_3$ and the fourth gear $A_4$. Namely, when the rotational motion of the input shaft 1 is transmitted to the output shaft 2, the two stage speed reduction effect is attained between the first and second gears $A_1$ and $A_2$ and the third and fourth gears $A_3$ and $A_4$.

Also, when the second gear $A_2$ and the third gear $A_3$ are engaged with the first gear $A_1$ and the fourth gear $A_4$ while taking the Coriolis motion, the respective engagement surfaces would be slidably moved with the conventionally known involute gear tooth form or spherical involute gear tooth form. This sliding movement generates noises, vibrations and heat to cause the heat sticking. In order to solve this problem, as shown in FIGS. 5 and 7, rollers 4 and inner contact surfaces 5 with the rollers are adopted for teeth of each gear. More specifically, as shown in FIG. 7, the rollers 4 are floatingly supported to the inner contact surfaces 5, with the rollers, formed in the first gear $A_1$ (fourth gear $A_4$) to form semi-cylindrical projection teeth. Also, the inner contact surfaces 5 are formed in the second gear $A_2$ (third gear $A_3$) to form the semi-circular groove-shaped recess teeth. Then, when the rotary member 3 takes the Coriolis motion in a direction indicated by an arrow B, the second gear $A_2$ (third gear $A_3$) is moved in a direction indicated by arrows C to cause the respective recess teeth to engage with the projection teeth. Then, the sliding movement generated between the respective recess and projection teeth is absorbed by the rotation of the rollers 4. (This is partially excerpted from NIKKEI MECHANICAL Oct. 28, 1996 No. 492.) Accordingly, it is unnecessary to set the backlash, and in addition, the pre-pressure is applied to the respective gears to make it possible to perform the engagement with high precision.

Thus, by using the rollers 4 and the inner contact surfaces 5 with the rollers 4 as the tooth shaped, it is possible to form the teeth less expensively and much more easily than the formation of the spherical involute gear. However, in order to form the semi-circular sleeve-shaped inner contact surfaces with a precise pitch and a precise angle with high precision, it is necessary to perform the positioning by manually using a precise jig or the like. This needs a highly skilled worker and is not suitable for the mass-projection.

SUMMARY OF THE INVENTION

In view of the defects inherent in the prior art, an object of the present invention is to provide a working apparatus that may continuously perform the positioning work of the workpiece with high accuracy to thereby mass-produce the Coriolis motion gears at low cost.

In order to overcome the above-noted defects, according to the present invention, the means is characterized in that: a ceiling surface of a body is formed into a rotary table; a drive shaft is projected from a center of the rotary table; a slant portion forming a predetermined angle with respect to an axis thereof is formed at an end of the drive shaft; a turntable on which a workpiece is to be installed is rotatably supported to the slant portion; a Coriolis motion gear body is formed by facing surfaces between the turntable and the rotary table; the turntable maintains the workpiece so that a swivel center of the Coriolis motion gear body is caused to be identical with an operation center when the workpiece is incorporated into a specific device so that a working surface generates an effect based upon a shape to be worked; and furthermore, a working means that takes a shape for obtaining a desired shape to be worked and that may be moved in a working direction of the workpiece in synchronism with the turntable is provided.

According to the present invention, by rotating the drive shaft, the engagement between the Coriolis motion gear bodies formed in the facing surfaces of the turntable and the rotary table. Then, the turntable is rotated by the number of teeth of the Coriolis motion gear bodies per one turn of the drive shaft. At this time, since the swivel center of the Coriolis motion gear bodies held by the turntable is identical with the working center when the workpiece is incorporated in the specific device so that the working surface generates the effect based upon the shape of the workpiece to be worked, the working surface of the workpiece takes the moving locus as the Coriolis motion body integral with the turntable. Accordingly, the working means is moved in the working direction of the workpiece in synchronism with the turntable, so that the working means is brought into contact with the working surface of the workpiece on the positional relationship generated only under the Coriolis motion. As a result, a desired gear shape or the like may be formed. It is therefore possible to form the Coriolis motion gear having a high precision.

Also, according to the present invention, it is preferable that the rotary table may be drivingly rotated at a desired angle when the turntable makes one turn. Then, the rotational angle of the turntable is increased or decreased in correspondence with the workpiece to be worked, and the working position is determined in correspondence with the workpiece having a different diameter. Then, the workpiece shape is formed with the same pitch for the workpiece having the different diameter.

Furthermore, according to the present invention, a Coriolis gear mechanism or an index table mechanism that is numerically controlled is used as a drive means of the rotary table. Then, the determination of the working position of the workpiece is exactly performed by the Coriolis motion gear mechanism or an NC controlled index stable mechanism.

DESCRIPTION OF THE PREFERRED EMBODIMENTS

Figure 1:
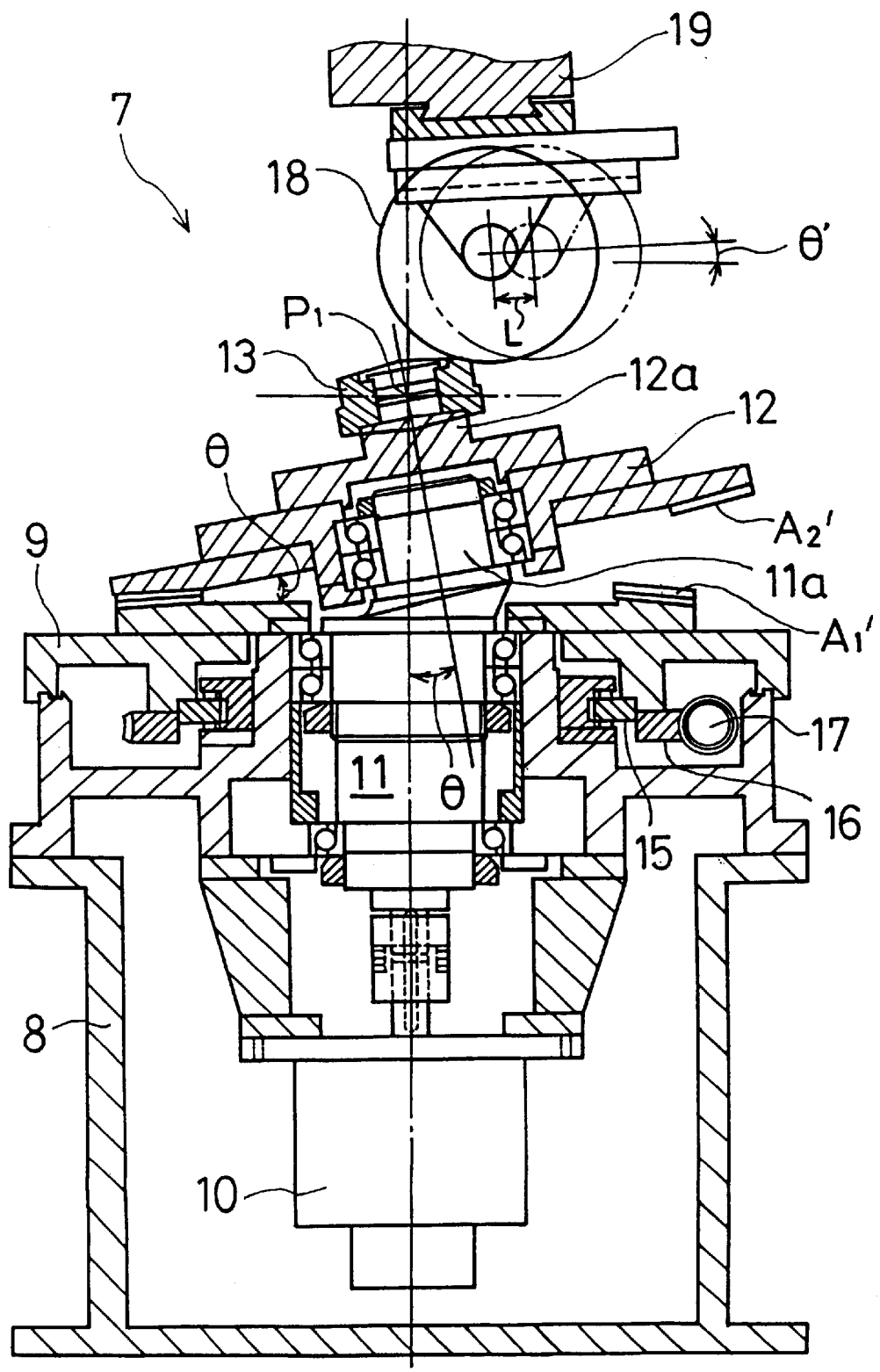
FIG. 1 is a schematic cross-sectional view showing a working apparatus of Coriolis motion gears in accordance with a first embodiment of the invention.

An embodiment of the present invention will now be described with reference to the accompanying drawings. In this case, the same reference numerals are used to denote the like components or members of the conventional example and a detailed explanation therefor will be omitted.

A working apparatus for producing the Coriolis motion gear according to a first embodiment of the invention is shown in FIG. 1. The working apparatus 7 includes a body 8 and, and a rotary table 9 which is mounted to and provides a ceiling surface for the body 8 is rotatable relative to the body 8. A drive shaft 11 projects from the center of the rotary table 9, and a servo motor 10 is connected to a lower end portion of the drive shaft 11. A slant portion 11a forming a predetermined angle θ relative to the axis of the drive shaft 11 is provided at the tip end of the drive shaft 10. Then, a turn table 12 is supported through bearings to the slant portion 11a. The Coriolis motion gear body is formed by the turntable 12 and the facing surface of the rotary table 9. Here, a gear formed on the rotary table 9 is referred to as a first gear $A_1'$. Also, a gear formed on the turntable 12 is referred to as a second gear $A_2'$. Since the rotary table 9 and the axis of the drive shaft 11 are arranged to intersect with each other at a right angle, an angle defined by the rotary table 9 and the turntable 12 is also θ.

Figure 2:
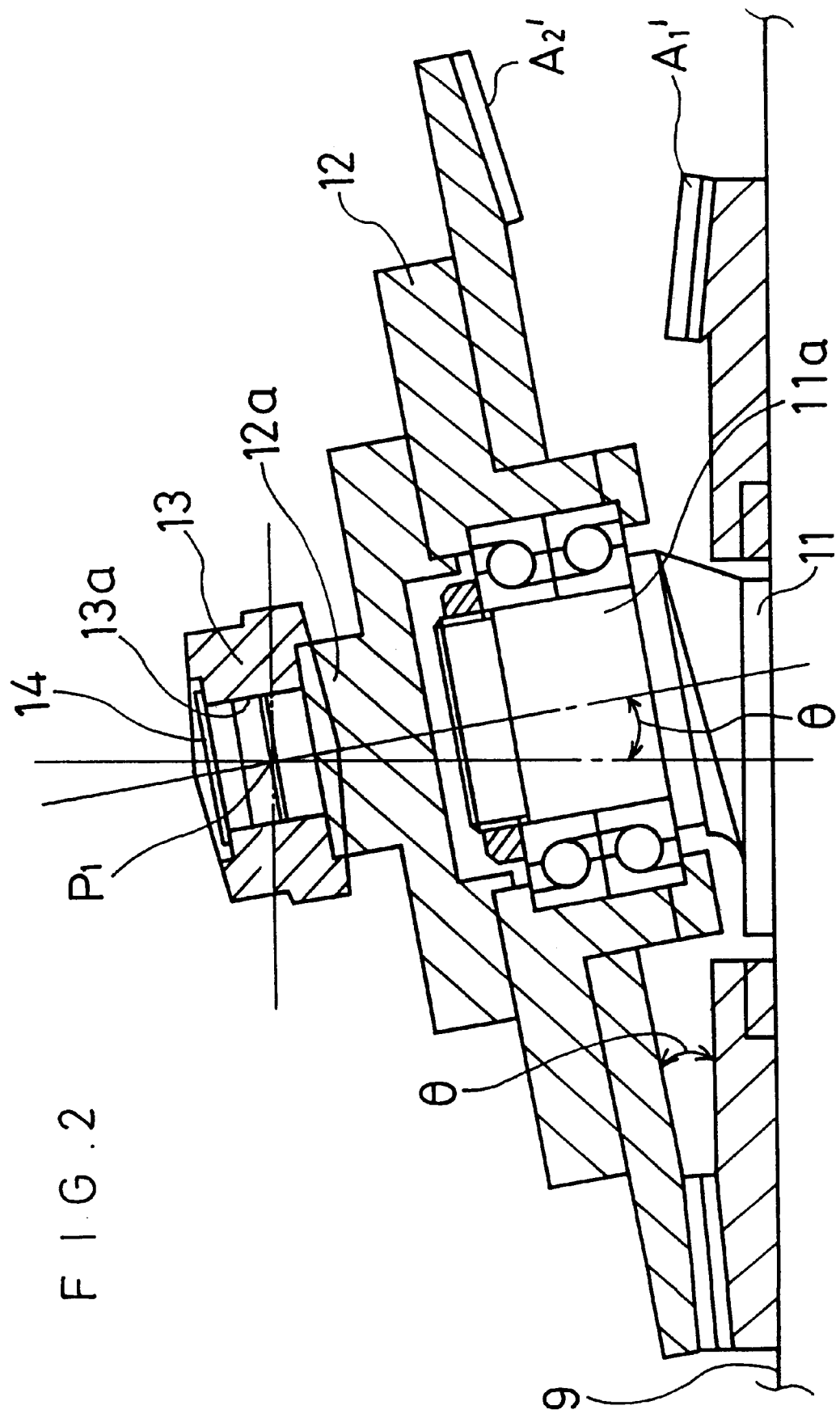
FIG. 2 is an enlarged view showing the vicinity of a workpiece retaining portion of the working apparatus of Coriolis motion gears shown in FIG. 1.

By the way, the turntable 12 may hold the workpiece 13 while a rotary center $P_1$ of the Coriolis motion of the Coriolis motion gears $A_1'$ and $A_2'$ is identical with an operational center (swivel center when the Coriolis motion is taken in this embodiment) when the surface to be machined generates the effect based upon its final workpiece shape while the workpiece 13 is installed in the special gear device. According to the embodiment of the invention, as shown in FIG. 2, a projection 12a extends toward the rotary center $P_1$ of the Coriolis motion gears $A_1'$ and $A_2'$ and a center hole 13a of the workpiece 13 is engaged with the projection. Furthermore, an end cap 14 is fitted from the top of the center hole 13a to clamp the workpiece 13 in cooperation with the projection 12a.

As shown in FIG. 1, the rotary table 9 is rotatably supported relative to the body 8 by a bearing 15. Then, worm wheel 16 is mounted in a concentric circle on the rotary table 9. Also, a worm gear 17 is provided at a position for engagement with the worm wheel 16 located on the body 8 side of the rotary table 9. Then, the worm gear 17 is rotated by a drive device, such as a motor (not shown), to drive the worm wheel 16 and to drivingly rotate the rotary table 9. Incidentally, it is possible to replace the rotary table 9 and the device for driving the rotary table 9 by an index table mechanism that is numerically controlled.

Figure 3:
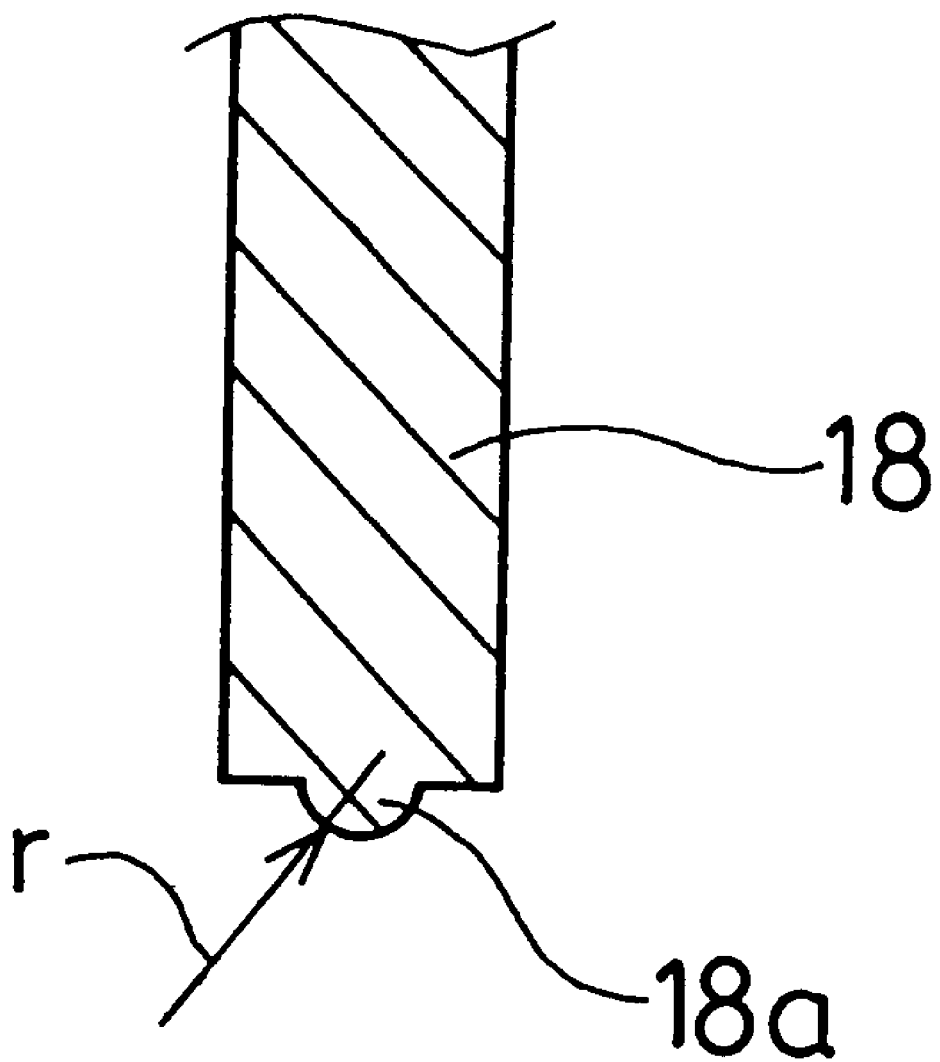
FIG. 3 is an enlarged cross-sectional view showing a cutter wheel of the working apparatus of Coriolis motion gears shown in FIG. 1.
Figure 7:
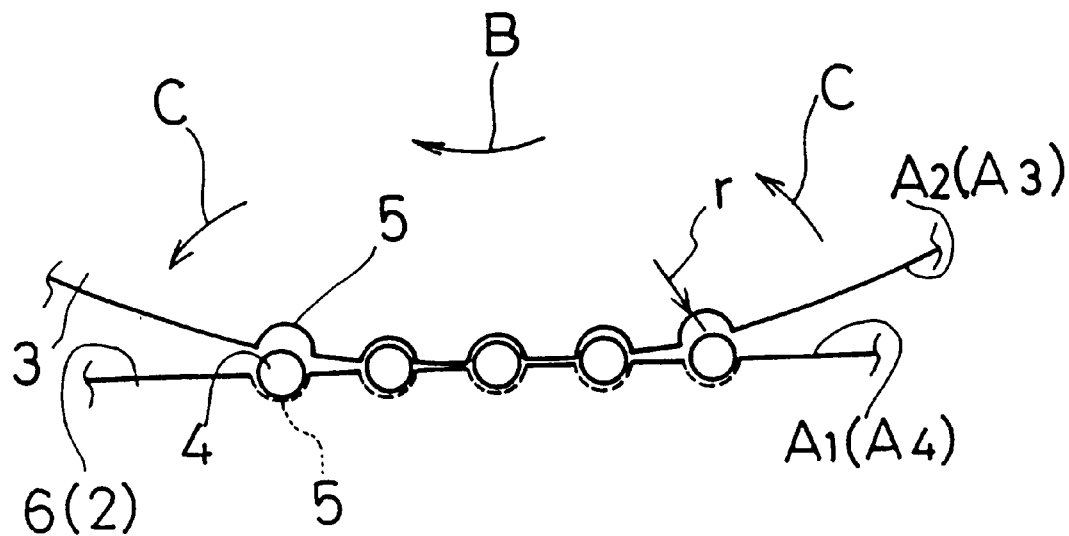
FIG. 7 is a schematic cross-sectional view showing the operation of the Coriolis motion gear device shown in FIG. 5.

Furthermore, in the working apparatus according to the first embodiment of the invention, a cutter wheel 18 is a tooth form forming means i.e., a machining means for forming a desired worked shape. The cutter wheel 18 is supported by a positioning device 19 that is numerically controlled. The distance to the workpiece 13 is adjustable as desired. Also, the cutter wheel 18 may move by a stroke L in a tooth groove direction (in a direction in which an angle θ' formed with respect to a horizontal line is ½θ in the example shown in FIG. 1) formed in the workpiece while rotating. This stroke L should be somewhat longer than a desired tooth width. By the way, as shown in FIG. 3, the cross-sectional shape of the circumferential end portion 18a of the cutter wheel 18 is a grinding wheel having a radius r that is substantially the same as that of the tooth form cross-sectional shape (semicircular shape having a radius r as shown in FIG. 7). This cutter wheel 18 is drivingly rotated and brought into contact with the workpiece surface of the workpiece 13 to be moved in the tooth groove direction so that the groove-shaped teeth in the form of the semicircular cross section may be formed by cutting. Incidentally, the tooth form forming means that may be used in the working apparatus is not limited to the cutter wheel 18, it is also possible to use a side cutter, a cutter wheel, such as a gliding stone cutter, an end mill (ball end mill), or a discharge electrode having the same cross section as that of the cutter wheel 18.

The operation of the thus constructed working apparatus will now be described. As first shown in FIGS. 1 and 2, when the workpiece 13 is fixed to the projection 12a of the turntable 12, as described above, the swivel center when the workpiece 13 is installed in the gear device to take the Coriolis motion is identical with the swivel center $P_1$ of the Coriolis motion gear bodies $A_1'$ and $A_2'$. Then, when the drive shaft 11 is rotated, the slant portion 11a takes a motion like a swing. The turntable 12 supported to this takes a swing motion. Then, the Coriolis motion. Then, the first gear $A_1'$ formed on the turntable 12 is engaged with the second gear $A_2'$ formed on the rotary table 9. At this time, the turntable 12 may be rotated corresponding to the tooth number difference of the Coriolis motion gear body per one turn of the drive shaft 11. For instance, if the number of teeth of the gear $A_1'$ is 100, and the number of teeth of the gear $A_2'$ is 101, when the drive shaft 11 makes one forward rotation, the second gear $A_2'$ is $\frac{1}{100}$ of the forward rotation of the first gear $A_1'$. Namely, it is possible to determine the working position by $\frac{1}{100}$ of the one turn of the workpiece per one turn of the drive shaft 11.

Accordingly, the cutter wheel 18 is moved in the tooth forming direction in synchronism with a timing of one forward rotation of the drive shaft 11 so that tooth-forms are formed on the surface, to be worked, of the workpiece 13 one by one. Also, because the swivel center $P_1$ of the Coriolis motion gear bodies $A_1'$ and $A_2'$ is identical with the swivel center of the workpiece 13 when mounted on the working apparatus, the surface, to be worked, of the workpiece 13 takes the moving locus of a machine third gear $A_3'$ which is, as mounted on the turntable 12, with the second gear $A_2'$ formed on the turntable 12. Accordingly, if the teeth are ground on the surface of the workpiece 13, the cutter wheel 18 may be thought of as serving as a gear which forms a pair with the surface of the workpiece 13 in which teeth are being formed (the cutter wheel may be thought of as a hypothetical fourth gear $A_4'$). Thus, the tooth-form formed on the surface, of the workpiece 13 is an ideal gear tooth for the third gear $A_3'$.

In the case where the teeth are always formed with the same pitch on the workpiece having the same diameter, as described above, it is sufficient to perform the positioning of the working position by the engagement between the Coriolis motion gear bodies $A_1'$ and $A_2'$. However, for workpieces having different diameters, it is necessary to perform the machining for producing the gears having the different gear tooth numbers. In such a case, it is necessary to change the rotational angle of the turntable 12 whenever the working positioning is determined. For example, for a gear having 40 teeth, the working position is determined at an angle which is obtained by dividing the circumference into forty segments. However, for the gear having 50 teeth, it is necessary to determine the working position at an angle which is obtained by dividing the circumference into fifty segments.

Therefore, in the working apparatus in accordance with the first embodiment of the invention, in comparison with the rotation of the above-described drive shaft 11, the worm gear 17 and the worm wheel 16 are rotated by a predetermined amount. Then, the rotary table 9 is rotated by the predetermined angle while the turntable 12 takes one turn. Then, the rotational angle of the turntable 12 whenever the working position is determined for one turn is increased or decreased in synchronism with the diameter of the workpiece 13 to be worked. Then, the tooth-forms are formed for the workpieces having different diameters. Also, in the case where the teeth are formed at different pitches for the workpieces having the same diameter or the different diameters, in the same manner, the rotational angle of the turntable 12 is increased or decreased. In a control of the rotational angle, the increment or decrement of the rotational angle in correspondence with the diameter of the workpiece or the increment or decrement of the rotational angle in response to the pitch of the teeth are set in advance in the controller for controlling the working apparatus. Then, the pitch of teeth or the workpiece diameter is inputted by the operator so that it is possible to automatically control the rotation of the worm gear 17 and the worm wheel 16.

The advantage of the thus described structure according to the first embodiment of the present invention is as follows. In the apparatus, since the workpiece 13 is fixed to the turntable 12 taking the Coriolis motion, the determination of the working position may be carried out at the rotational angle of the turn table 12 generated during one turn of the drive shaft 11 (caused by the engagement of the Coriolis motion gear bodies $A_1'$ and $A_2'$). Also, the workpiece 13 is fixed to the turntable 12 so that the swivel center when, in the future the workpiece 13 is actually incorporated in a gear device to take the Coriolis motion, the swivel center is substantially identical with the swivel center $P_1$ of the Coriolis motion gear bodies $A_1'$ and $A_2'$. Thus, the surface, to be worked, of the workpiece 13 forms a moving locus for creating the third gear $A_3'$ as the workpiece is, during machining, integrally related with the second gear $A_2'$ in the turntable 12. Accordingly, the teeth are formed on the work surface of the workpiece 13 by grinding by the cutter wheel 18, so that the cutter wheel 18 becomes a hypothetical gear forming a couple with the workpiece 13. The gear tooth shape formed on the work surface of the workpiece 13 may become ideal.

A working apparatus for Coriolis motion gears in accordance with a second embodiment of the invention will now be described with reference to FIG. 4 in which the same reference numerals are used to denote the like members or components of the first embodiment. The detailed explanation therefor will be omitted.

The difference between the first embodiment and the second embodiment is that in the second embodiment, a Coriolis motion gear mechanism is used as a drive mechanism for a rotational drive of a rotary table 9 instead of the worm gear. In the Coriolis motion gear mechanism, an input shaft 20 is a hollow shaft having a large diameter and receives in its hollow portion a drive shaft 11, a support structure for the drive shaft or the like. A first gear $A_1"$ and a fourth gear $A_4"$ are formed on a body 8 and the rotary table 9, respectively. A second gear $A_2"$ and a third gear $A_3"$ are formed in a rotary body 21 supported through a bearing to a slant portion 20a of the input shaft 20. Also, a magnet 22 is mounted on the input shaft 20, and a coil 23 is provided to a portion of the body 8 facing the magnet 22 to form a motor. Accordingly, the input shaft 20 is drivingly rotated by exciting the coil 23. Furthermore, an encoder 24 is mounted on the input shaft 20 to exactly detect the number of revolutions.

Thus, the Coriolis motion gear mechanism is used for the driving rotation of the rotary table 9 to perform the control of the rotational angle of the rotary table 9 with high precision to thereby perform the determination of the working position. In a method in which the worm gear is used as in the first embodiment, in order to obtain the same operational precision as that of the Coriolis motion gear mechanism in accordance with the second embodiment, the worm gear having a super high precision is required to increase the manufacture cost, disadvantageously. This disadvantage may be overcome by the second embodiment.

Figure 4:
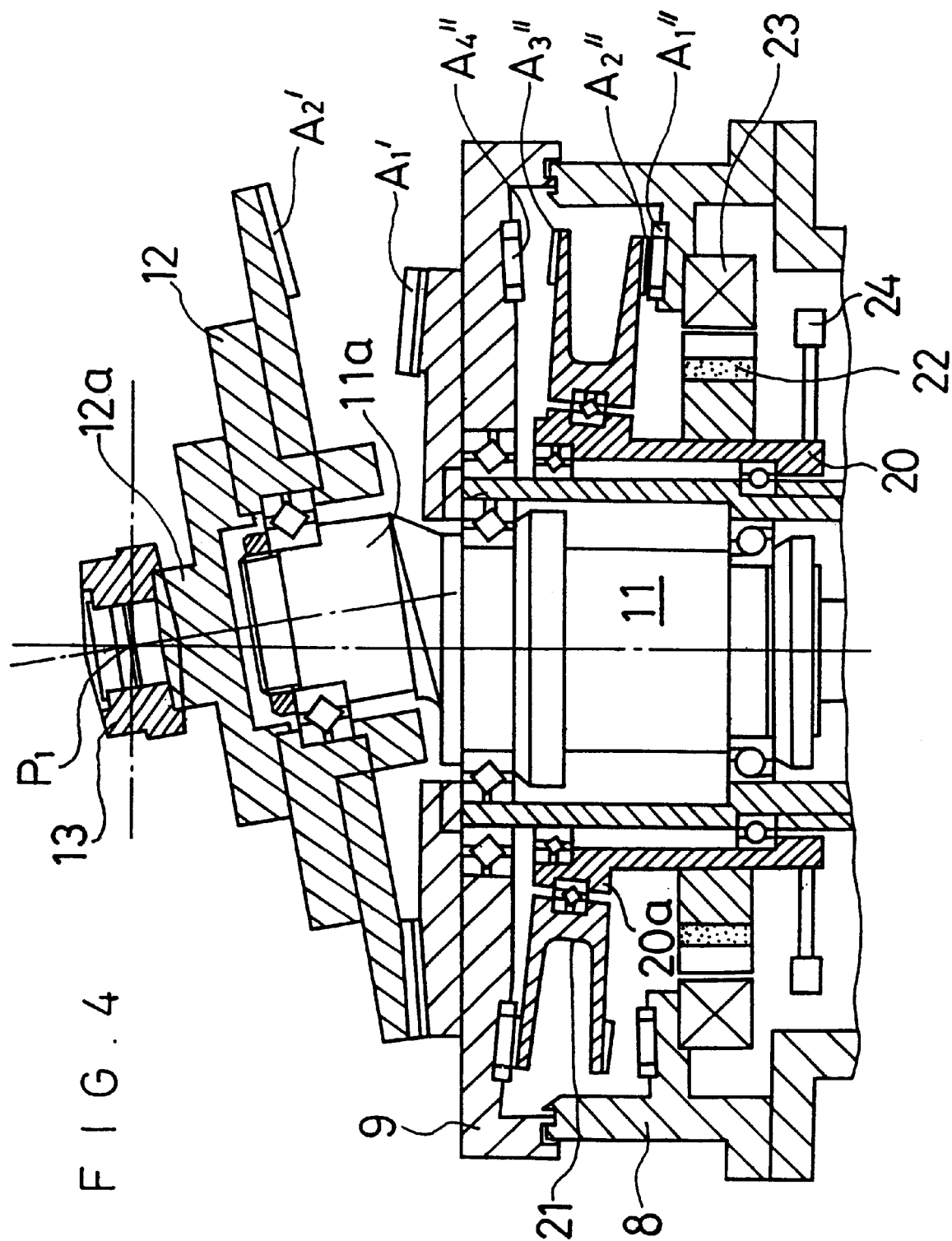
FIG. 4 is a partially schematic cross-sectional view showing a working apparatus of Coriolis motion gears in accordance with a second embodiment of the invention.
Figure 5:
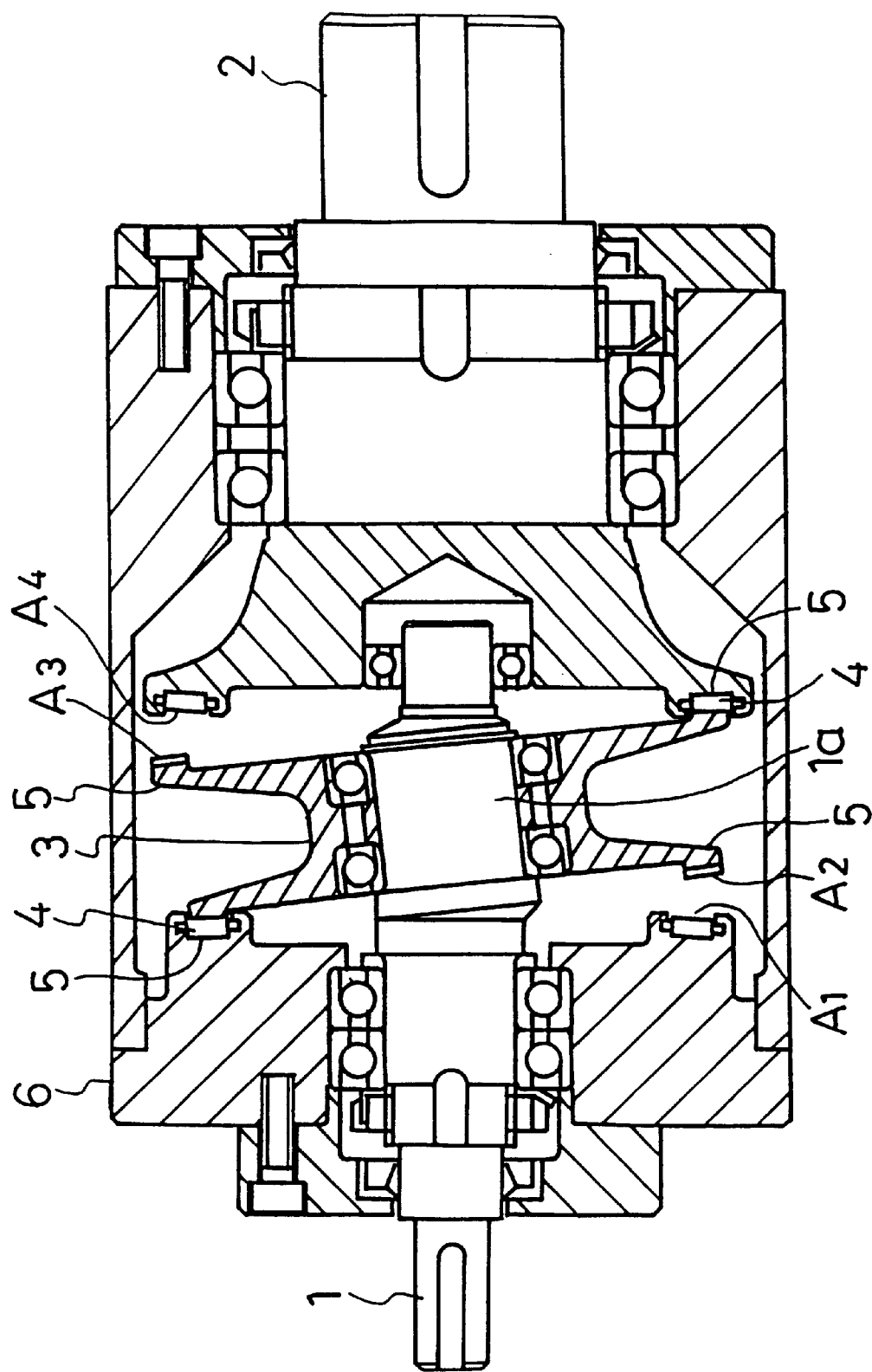
FIG. 5 is a schematic cross-sectional view showing a Coriolis motion gear device that is put into practice.
Figure 6A:
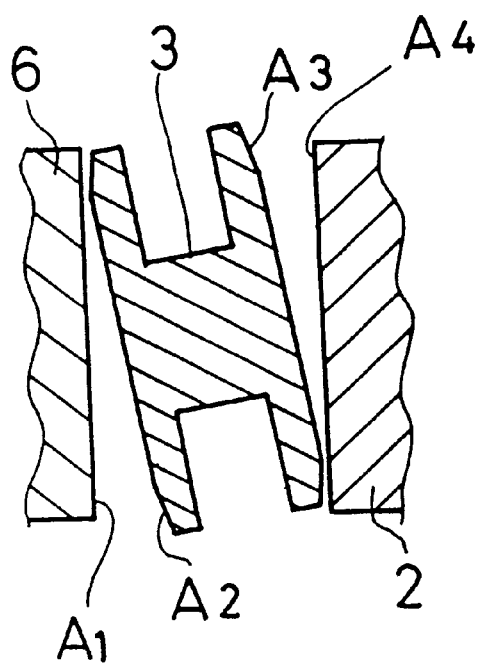
FIGS. 6A and 6B are a schematic cross-sectional view showing the operation of the Coriolis motion gear device shown in FIG. 5.
Figure 6B:
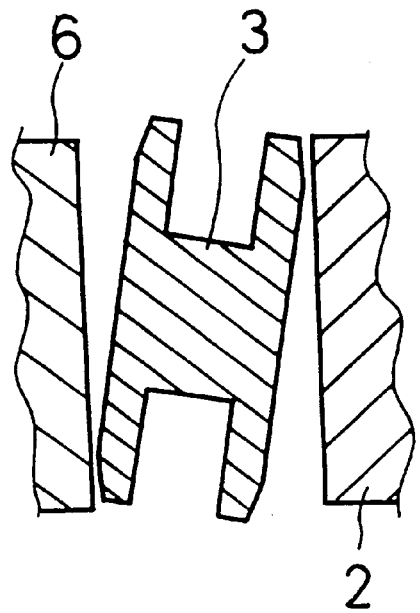

Also, in the second embodiment as shown in FIG. 4, an assembly angular contact bearing is not used as the bearing but a cross roller bearing is used. With respect to the detail of the cross roller bearing, it is preferable to use the cross roller that is disclosed in another Japanese Patent Application filed on the same date by the present applicant for the miniaturization of the apparatus as a whole. Incidentally, also in the second embodiment, it is possible to use the assembly angular contact bearing in the same manner as in the first embodiment. Incidentally, the cross roller bearing has the same effect as that of the assembly angular contact bearing. With respect to the other aspects, the explanation for the same effects as those of the first embodiment will be omitted.

As described above, according to the present invention, it is possible to enjoy the following advantages. In the working apparatus provided with a rotary table for working the workpiece in accordance with a first aspect of the invention, the drive shaft is rotated so that the engagement is effected in the Coriolis motion gear bodies formed in the facing surfaces between the turntable and the rotary table. Then, since the turntable is rotated by the difference in tooth number of the Coriolis motion gear bodies per one turn of the drive shaft, it is possible to perform the determination of the work position of the workpiece whenever the drive shaft makes one rotation. At this time, because the swivel center of the Coriolis motion gear bodies is identical to the turntable with the working center when the workpiece is incorporated in the specific device, the working surface generates the effect based upon the shape of the workpiece to be worked that the working surface of the workpiece takes the moving locus as a Coriolis motion body integral with the turntable. Accordingly, the means for forming the tooth shape or the like is moved in the tooth direction of the workpiece in synchronism with the turntable, the means for forming the tooth shape or the like is brought into contact with the working surface of the workpiece as if it was the gear that forms a couple and would be engaged with the workpiece after machining. As a result, a desired gear shape or the like may be formed. It is therefore possible to form the Coriolis motion gear which a high precision.

Also, in a working apparatus of the Coriolis motion gear according to a second aspect of the invention, the rotary table may be drivingly rotated at a desired angle when the turntable takes one turn, and may increase or decrease the rotational angle of the turntable in correspondence with the diameter of the workpiece to be worked and may perform the determination of the work position in correspondence with the different diameter of the workpiece. It is therefore possible to manufacture the Coriolis motion gear or the like with various diameters, teeth and pitches of teeth.

Furthermore, in a working apparatus of the Coriolis motion gear according to a third aspect of the invention, the Coriolis motion gear mechanism is used as the drive means of the rotary table to thereby provide a manufacture apparatus that may perform the determination of the work surface in a less costly manner.

As described above, by using the working apparatus of the Coriolis motion gear according to the present invention, it is possible to produce the articles, that are produced only by the Coriolis motion, such as Coriolis motion gears or the like in a mass-production manner and at low cost.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A working apparatus having a body, comprising:

a rotary table rotatably mounted on a ceiling surface of the body;

means for rotatably driving the rotary table;

a drive shaft projecting from a center of the rotary table, the drive shaft provided with a slant portion at its distal end, the slant portion having an axis with a predetermined angle formed relative to an axis of the drive shaft;

a turntable provided rotatably mounted on the slant portion of the drive shaft, the turntable for mounting a workpiece in a slanting manner;

gear means for taking Coriolis motion, the gear means provided on opposing faces between the turntable and the rotary table and engaging the turntable and the rotary table with each other;

working means for forming a desired shape of the workpiece, the working means provided movably along a surface to be worked of the workpiece in synchronism with rotation of the turntable, wherein the turntable to which the workpiece is fixed such that a swivel center of the gear means taking Coriolis motion is the same as a swivel center of the workpiece taking Coriolis motion when mounted on the turntable.

2. The working apparatus according to claim 1, wherein the rotary table may be drivingly rotated at a desired angle when the turntable makes one turn.

3. The working apparatus according to claim 2, wherein a Coriolis gear mechanism is used as a drive means of the rotary table.

4. The working apparatus according to claim 2, wherein an index table mechanism that is numerically controlled is used as a drive means of the rotary table.

* * * * *